United States Patent [19]

Sugino et al.

[11] Patent Number: 4,582,677

[45] Date of Patent: Apr. 15, 1986

[54] METHOD FOR PRODUCING HONEYCOMB-SHAPED METAL MOLDINGS

[75] Inventors: Morihiko Sugino, Kamakura; Kouichi Kobayashi, Chigasaki; Mitsunobu Nikaido, Kamakura; Takazi Kumazawa, Ooiso; Eiji Saura, Fujisawa, all of Japan

[73] Assignee: Kabushiki Kaisha Kobe Seiko Sho, Kobe, Japan

[21] Appl. No.: 304,684

[22] Filed: Sep. 22, 1981

[30] Foreign Application Priority Data

Sep. 22, 1980 [JP] Japan ................................. 55-132056
Sep. 22, 1980 [JP] Japan ................................. 55-132057

[51] Int. Cl.$^4$ .............................................. B22F 3/12
[52] U.S. Cl. ................................. 419/2; 419/23; 419/36; 419/37; 419/41
[58] Field of Search .................... 419/2, 36, 37, 41, 23

[56] References Cited

U.S. PATENT DOCUMENTS 3,899,326  8/1975  Frost et al. ............................ 419/41
3,989,863  11/1976  Jackson et al. ....................... 419/40

FOREIGN PATENT DOCUMENTS 65702     12/1982  European Pat. Off. .
2415730   10/1974  Fed. Rep. of Germany ........ 419/37
57688     12/1981  Japan ..................................... 419/37
132056    4/1982   Japan ..................................... 419/37
2074191   10/1981  United Kingdom ................. 419/37

*Primary Examiner*—Teddy S. Gron
*Assistant Examiner*—Anne Brookes
*Attorney, Agent, or Firm*—Oblon, Fisher, Spivak, McClelland & Maier

[57] ABSTRACT

Method for producing molded metallic honeycomb structures of high physical strength and porosity, the method comprising forming a honeycomb structure by extruding through a die a kneaded mixture of a metal powder and a binder capable of forming a supporting bone structure for the metal powder upon application of heat, and, after drying, sintering the honeycomb structure.

5 Claims, No Drawings

METHOD FOR PRODUCING HONEYCOMB-SHAPED METAL MOLDINGS

BACKGROUND OF THE INVENTION (1) Field of the Invention

This invention relates to a method for producing honeycomb-shaped metal moldings.

(2) Description of the Prior Art

Various uses of porous inorganic materials are being rapidly developed, employing them in diversified forms such as pellets, beads, rings and honeycombs depending upon the purpose of use. Among them, the porous inorganic materials in a honeycomb shape have come to play an important role as catalyst carriers or cores therefor due to a number of advantages inherent in the honeycomb shape, including (1) low pressure loss, (2) larger specific surface area, (3) easiness of handling and (4) smaller abrasive wear.

The conventional honeycomb-shaped moldings are mainly classified into:

(1) Extrusion-molded ceramics; and
(2) Laminated structures consisting of flat and wavy or corrugated metal sheets.

These honeycomb structures are unsatisfactory as catalyst carriers. Namely, the catalyst carrier and the core material for the carrier are required to be:

(A) Porous and good in adhesion of a coating agent or a catalyst;
(B) Satisfactory in physical strength and hard to break; and
(C) Chemically stable and non-influential on the catalyst activity.

The ceramic type carriers mentioned at (1) of the preceding paragraph exhibits the problem that the conditions of the heat treatment which satisfy the required physical strengths are inconsistent with the conditions of heat treatment which are necessary to achieve the desired porosity. The metallic carriers mentioned at (2) require complicated pretreatments to enhance the adhesion of the coating agent or the like. Accordingly, the provision of a suitable honeycomb-shaped metal molding remains an unfulfilled need.

SUMMARY OF THE INVENTION

Under these circumstances, the present invention has as its object the provision of a method for producing honeycomb-shaped metal molding which have porosity comparable to that of the ceramics as well as the physical strength inherent to the metal.

More specifically, the present invention provides a method for producing metallic honeycombs of high porosity and strength, the method comprising molding a honeycomb structure by extruding a kneaded mixture of a powdery base metal and a binder capable of forming a supporting structure for the metal powder, i.e., a hardenable binder or colloidal silica and/or colloidal alumina, and sintering the honeycomb structure after drying.

The above and other objects, features and advantages of the invention will become apparent from the following description and the appended claims.

PARTICULAR DESCRIPTION OF THE INVENTION

Examples of the metal powder useful in the present invention include powders of Fe, Al, Cu, Ti, Zr, Ni, Cr and various other alloys. A suitable metal powder is selected in consideration of the purpose of use of the honeycomb structure to be produced. In some cases, different kinds of metal powders may be used in combination. The hardenable binder to be blended into the metal powder may be any synthetic resin which is hardenable by heat, light or ultraviolet ray. Preferred examples of the hardenable binder are synthetic resins having a cyclic group (saturated carbocyclic group, saturated heterocyclic group, aromatic group, unsaturated heterocyclic group or the like), more particularly, phenol resins, furan resins, xylene-formaldehyde resins, melamine resins and aniline resins. These hardenable binders still maintain three-dimensional carbon structures at a temperature of about 1100° C. at which the sintering is just to be initiated, thereby supporting particles of the metal powder. As soon as the temperature is raised above 1100° C. to start the sintering, the supporting carbon structures are gradually disintegrated, preventing the metal powder particles from adhering in intimate contact with each other. At the stage where the metallic bone structure is being formed, the particles of the disintegrated carbon structure still remain on the surfaces of the metallic bone structure. Therefore, upon removing the carbon particles by air blowing or washing means subsequent to the sintering, there remains a metallic bone structure with internal pores, giving a metal product which is rich in porosity. On the contrary, if a thermoplastic binder is blended, it is deformed easily before the sintering temperature is reached and the metal powder particles are adhered intimately to each other, making it difficult to obtain desired porosity.

In a case where colloidal silica or colloidal alumina is blended into the metal powder as a binder, it supports the particles of the metal powder by a bone structure based on the network of Si—O—Si or Al—O—Al, forming a composite sintered structure of metal —O—Si—O or metal —O—Al—O in the sintering process. The network structure which contains a multitude of pores also contributes to impart high physical strengths to the ultimate sintered product in addition to high porosity.

Prior to extruding the kneaded mixture of the above-mentioned metal powder and binder, a further component, for example, a lubricant may be added thereto if desired. Examples of the lubricant which facilitates the extruding operation by lessening the resistance in the extruding nozzle include CMC, stearic acid, tarc, polyethylene glycol and the like. Further, the extruding mixture may be added with a substance which burns off by combustion like organic substances of low or high molecular weight. Such an organic substance leaves pores upon burning off and thus serves to increase the porosity of the sintered product. Although there is almost no limitation on the kind of the organic substance to be used, its additive amount should be smaller than 20 wt % on the metal powder. This is because burn-off of an organic substance in excess of 20 wt % will result in an excessive porosity and cause not only deformations during the sintering process or drops in physical strengths but also degradations in shape-retainability.

The metal powder is preferred to have a particle size smaller than about ⅔ of the slit width of the extruding die. In the extrusion of honeycomb structures, the metal particles are jammed to each other during passsage through the extruding die, so that metal particles with a particle size greater than about ⅔ of the slit width tend to clog the slit when aligned side by side or by forming larger blocks. The fluidity of the kneaded mixture of the metal powder and binder is greatly influenced by the particle size distribution of the metal powder, particularly, by the content of smaller particles. More specifically, it has been found that the kneaded mixture has a suitable fluidity when the metal powder contains less than about 20% of particles which have diameters greater than about ½ of the slit width and more than 10% of fine particles which have diameters smaller than about 1/5 of the slit width, along with the particles of the maximum size.

Although the present invention is not limited by the type of the extruder or extruding conditions, it is recommended to employ an extruding speed higher than 5 mm/sec since there is a strong tendency of causing surface defects such as burrs and bruises at extruding speeds lower than 5 mm/sec. In order to ensure such an extruding speed, it may be desirable to soften the kneaded mixture to some extent by increasing the additive amount of the hardenable binder. However, in such a case, the extruding pressure drops as the extruding speed is increased, impairing the shape-retainability of the extrudate and causing the cell walls of the extruded honeycomb structure to deform and adhere to each other before it is dried in the subsequent drying stage. Therefore, the pressure which acts on the internal surfaces of the extruding die should desirably be maintained constantly at a level higher than 90 kg/cm². In this regard, a plunger type extruder is preferred to a screw type extruder in order to control these extruding conditions effectively.

The extrudate is dried under heated condition before sintering same. Although there are no particular restrictions on the sintering condition, especially the sintering temperature and time, it is recommended to select a sinter atmosphere according to the following criteria. In a case where the metal powder is included simply as an aggregate for the honeycomb structure, for instance, in a case where powder of iron or iron alloy is used, it is desirable to conduct the sintering in a non-oxidative atmosphere for preventing drops in physical strengths as caused by oxidation. On the other hand, in a case where a powder of Al or Mg is used, it is desirable to maintain an activating atmosphere during or after sintering for activating the surfaces of the honeycomb structure by oxidation, carbonization, nitrification or sulfurization, thereby to impart catalytic action thereto or to improve the adhesion of a catalyst on the honeycomb structure to be employed as a carrier. For example, if a molded honeycomb structure using powder of Al is heated in humid air after sintering in a non-oxidative atmosphere, Al on the surfaces of the moldings precipitates in the form of $Al(OH)_3$, which turns into γ-alumina by oxidation upon heating the moldings in dry argon, imparting excellent catalytic activity to the molded honeycomb structure itself.

The molded honeycomb structure produced by the above-described method of the invention has an extremely strong bone structure formed by the metal powder and internally contains a multitude of fine pores to ensure high porosity. Moreover, the method of the invention permits to achieve the aforementioned object by the use of simple means of fabrication.

The invention is illustrated more particularly by the following Examples.

EXAMPLE 1

Specimens were prepared by blending and kneading the raw materials in the compositions shown in Table 1, followed by extrusion-molding and sintering under the following conditions.

(1) Extruder: 100 mmφ plunger type extruder,
(2) Extruding pressure: 108 kg/cm²,
(3) Extruding speed: 25 mm/sec,
(4) Size of moldings: 50 mmφ, 100 cells/m²,
(5) Drying conditions: 107° C.×24 hrs,
(6) Sintering condition:
  Temperature: 1128° C.,
  Time: 5 hrs,
  Atmosphere: Argon.

In the case of Specimen No. 2, $Al(OH)_3$ was precipitated by heating the sintered moldings at 500° C. for 5 hrs. under a pressure of $P_{H_2O}=0.15$ and then oxidized into the form of ε-alumina by a further heat treatment at 550° C. for 5 hrs.

The moldability and physical properties of the sintered products were as shown in Table 1 below.

TABLE 1

| Specimen Nos. | 1 | 2 | 3 | 4 | 5 |
| --- | --- | --- | --- | --- | --- |
| Composition (Parts by weight) | | | | | |
| SUS powder | 100 | — | — | — | — |
| Al powder | — | 100 | — | — | — |
| Cu powder | — | — | 100 | — | — |
| Ti powder | — | — | — | 100 | — |
| Zr powder | — | — | — | — | 100 |
| CMC | 3 | 3 | 3 | 3 | 3 |
| Phenol resin | — | 15 | 15 | 15 | 15 |
| Methanol | 10 | 10 | 10 | 10 | 10 |
| Polyethylene powder | 10 | 2 | 2 | 2 | 2 |
| Moldability | Good | Excellent | Excellent | Excellent | Good |
| Deformation in sintering | Nil | Nil | Nil | Nil | Nil |
| Porosity | Excellent | Good | Good | Good | Good |
| Moisture adsorptivity (%) | 22 | 8 | 7 | 9 | 9 |
| Strength (kg/cm²) | 18 | 18 | 11 | 31 | 28 |
| Sintering condition | 1128° C. 5 hrs Argon | 580° C. 5 hrs Argon ↓ 550° C. 5 hrs Air | 990° C. 3 hrs Argon | 882° C. 3 hrs Argon ↓ 840° C. 5 hrs Air | 857° C. 3 hrs Argon ↓ 842° C. 5 hrs Air |

The shape of the SUS powder used for Specimen No. 1 was as follows.

Apparent density: 2.9 g/cm³

| Grain size: | | | |
| --- | --- | --- | --- |
| | +100 | (mesh) | 2.3% |
| −100 | +150 | (mesh) | 13.7% |
| −150 | +200 | (mesh) | 20.1% |
| −200 | +250 | (mesh) | 26.5% |
| −325 | | (mesh) | 37.5% | the specimens using the phenol resin, a thermohardening binder, show no deformation in the sintering stage and have excellent porosity. Especially the addition of an organic substance like the polyethylene powder resulted in a higher moisture absorptivity, indicating formation of an increased number of pores in the sintering stage by burning off the organic substance. With regard to the strength, the specimen using the SUS powder excelled the specimen using Al powder.

EXAMPLE 2

Specimens were prepared in a manner similar to and under the same conditions as in Example 1 except for the use of colloidal silica and/or colloidal alumina as a binder. The moldability and physical properties of the sintered products were as shown in Table 2 below.

TABLE 2

| Specimen Nos. | 1 | 2 | 3 | 4 | 5 |
|---|---|---|---|---|---|
| Composition (Parts by weight) | | | | | |
| SUS powder | 100 | — | — | — | — |
| Al powder | — | 100 | — | — | — |
| Cu powder | — | — | 100 | — | — |
| Ti powder | — | — | — | 100 | — |
| Zr powder | — | — | — | — | 100 |
| CMC | 3 | 3 | 3 | 3 | 3 |
| Colloidal silica | 20 | 0 | 20 | 20 | 20 |
| Colloidal alumina | 10 | 30 | 5 | 5 | 10 |
| Water | 10 | 10 | 10 | 10 | 10 |
| Polyethylene | 10 | — | — | — | — |
| Moldability | Good | Excellent | Excellent | Excellent | Good |
| Deformation in sintering | Nil | Nil | Nil | Nil | Nil |
| Porosity | Excellent | Good | Good | Good | Good |
| Moisture absorptivity (%) | 22 | 11 | 8 | 9 | 8 |
| Strength (kg/cm$^2$) | 18 | 16 | 15 | 28 | 23 |
| Sintering condition: | 1128° C. 5 hrs Argon | 580° C. 5 hrs Argon ↓ 550° C. 5 hrs Air | 990° C. 3 hrs Argon | 882° C. 3 hrs Argon ↓ 840° C. 5 hrs Air | 857° C. 3 hrs Argon ↓ 842° C. 5 hrs Air |

As seen in Table 2, the molded honeycomb structures using colloidal silica or colloidal alumina as a binder were free of deformation in the sintering stage and exhibited satisfactory porosity.

What is claimed is:

1. A method for producing porous molded metallic honeycomb structures, comprising:

forming a honeycomb structure by extruding through a die a kneaded mixture of a metal powder comprised of metal particles smaller than about two thirds of the slit width of said die in maximum grain size and containing particles greater than about one half of said die slit in a proportion less than 20% and particles smaller than about one fifth of said die slit in a proportion greater than 10% of the metal powder taken as a whole and a binder selected from the group consisting of thermohardening synthetic resins, colloidal silica, colloidal alumina, and mixtures thereof capable of forming a supporting structure for said metal powder upon application of heat and;

after drawing, heating the molded honeycomb structure to sinter said metal powder.

2. The method of claim 1, wherein said kneaded mixture is extruded through said die by applying a pressure higher than 90 kg/cm$^2$ on the internal surfaces of said die and at a linear speed higher than 5 mm/sec.

3. The method of claim 1, wherein the molded honeycomb structure is sintered in a non-oxidative atmosphere.

4. The method of claim 1, wherein the molded honeycomb structure is sintered in an atmosphere which causes surfaces of said honeycomb structure to exhibit catalytic activity.

5. The method of claim 1, wherein said kneaded mixture further contains an organic substance selected such that said organic substance is burnt off during said sintering to thereby increase the porosity of said honeycomb structure.

* * * * *